Aug. 11, 1953　　F. J. WHITE ET AL　　2,648,428
SHIPPING CONTAINER
Filed Oct. 12, 1948　　　　　　9 Sheets-Sheet 1

Fig. 1.

Inventors
CARL WILLIAM SCOTT &
FRANK J. WHITE
By Arnold and Mathis
Attorneys

Aug. 11, 1953  F. J. WHITE ET AL  2,648,428
SHIPPING CONTAINER
Filed Oct. 12, 1948  9 Sheets-Sheet 2

Inventors
CARL WILLIAM SCOTT &
FRANK J. WHITE
By Arnold and Mathis
Attorneys

Inventors
CARL WILLIAM SCOTT &
FRANK J. WHITE
By Arnold and Mathis
Attorneys

Aug. 11, 1953          F. J. WHITE ET AL          2,648,428
                       SHIPPING CONTAINER
Filed Oct. 12, 1948                          9 Sheets-Sheet 7

Inventors
CARL WILLIAM SCOTT &
FRANK J. WHITE
By
Arnold and Mathis
Attorneys

Aug. 11, 1953  F. J. WHITE ET AL  2,648,428
SHIPPING CONTAINER

Filed Oct. 12, 1948  9 Sheets-Sheet 8

Inventors
CARL WILLIAM SCOTT &
FRANK J. WHITE
By
Arnold and Mathis
Attorneys

Aug. 11, 1953    F. J. WHITE ET AL    2,648,428
SHIPPING CONTAINER
Filed Oct. 12, 1948    9 Sheets-Sheet 9

Inventor
CARL WILLIAM SCOTT &
FRANK J. WHITE
By Arnold and Mathis
Attorney

Patented Aug. 11, 1953

2,648,428

UNITED STATES PATENT OFFICE 2,648,428

SHIPPING CONTAINER

Frank J. White, Seattle, and Carl William Scott, Kirkland, Wash., assignors to Tote Engineering, Inc., Seattle, Wash., a corporation of Washington Application October 12, 1948, Serial No. 54,114

1 Claim. (Cl. 206—56)

Our invention relates to a shipping bin device.

In the prior art of transportation of commodities, such as grain, flour, rice, feed ingredients, sugar, nuts, and the like, two systems were generally employed. First, the articles were shipped in bulk such as in box cars or they were shipped in relatively small containers.

It is the object of this invention to provide a bin construction of a size so that material of the type indicated can be shipped substantially as a bulk shipment but at the same time is contained in bins of a sufficient size so that the various units can be readily, rapidly and efficiently handled by modern cargo or freight handling equipment, such as lift trucks.

It is an object of this invention to provide shipping bins which permit cargo or freight to be handled with all of the benefits of bulk transportation and at the same time with all the benefits of package shipment so far as handling and protection of merchandise is concerned.

It is the further object of this invention to provide a sealed shipping bin which brings about many benefits, such as the protection of the merchandise against the elements, whether the bins are shipped or open cars or are being handled in moving from one storage place to another. Furthermore, such a type of container permits shipping of types of merchandise not heretofore subject to shipment, such as flour containing volatile and perishable ingredients.

It is the further object of this invention to provide a container of minimum mass and material which at the same time, by the nature of its construction, permits considerable jarring and movement of parts of a box car with minimum liability of damage to the container and merchandise therein. More specifically, a bin of this invention permits the merchandise, such as flour, to absorb the shock, jar or strain incident to railroad transportation rather than by the container itself.

More specific objects of this invention are to provide a transportation bin having a substantial space therein, such as approximately 14 square feet, and with a minimum and fixed weight of the bins, such as 234 pounds.

Another object is to provide a bin having a sealable door over a discharge opening adjacent the lower or bottom wall of the container and a sealable intake opening disposed on an upper wall or top surface of the bin.

It is the further object of the invention to provide a shipping bin having combined therewith supporting legs providing a shipping skid or pallet on the bottom of the bin so that the ordinary commercial fork lift trucks can be employed for loading, unloading, or other incident handling involved in transportation of the bin.

It is the further object of this invention to provide a transportation bin which is subject to "high piling" or one that is subject to having one unit stacked upon the other to provide a plurality of superposed tiers.

It is another object to provide a transportation bin which is subject to mass production, economical to produce, having long life even though subjected to usual rough handling during transportation, and one which can be maintained substantially free from vermin, infestation and the like.

Other detailed objects of this invention will appear from the description of the parts of devices embodied in this invention and their incident mode of operation.

The above mentioned general objects of this invention, together with others inherent in the same, are attained by the devices illustrated in the accompanying drawings, throughout which like reference numerals indicate like parts.

Figure 1:
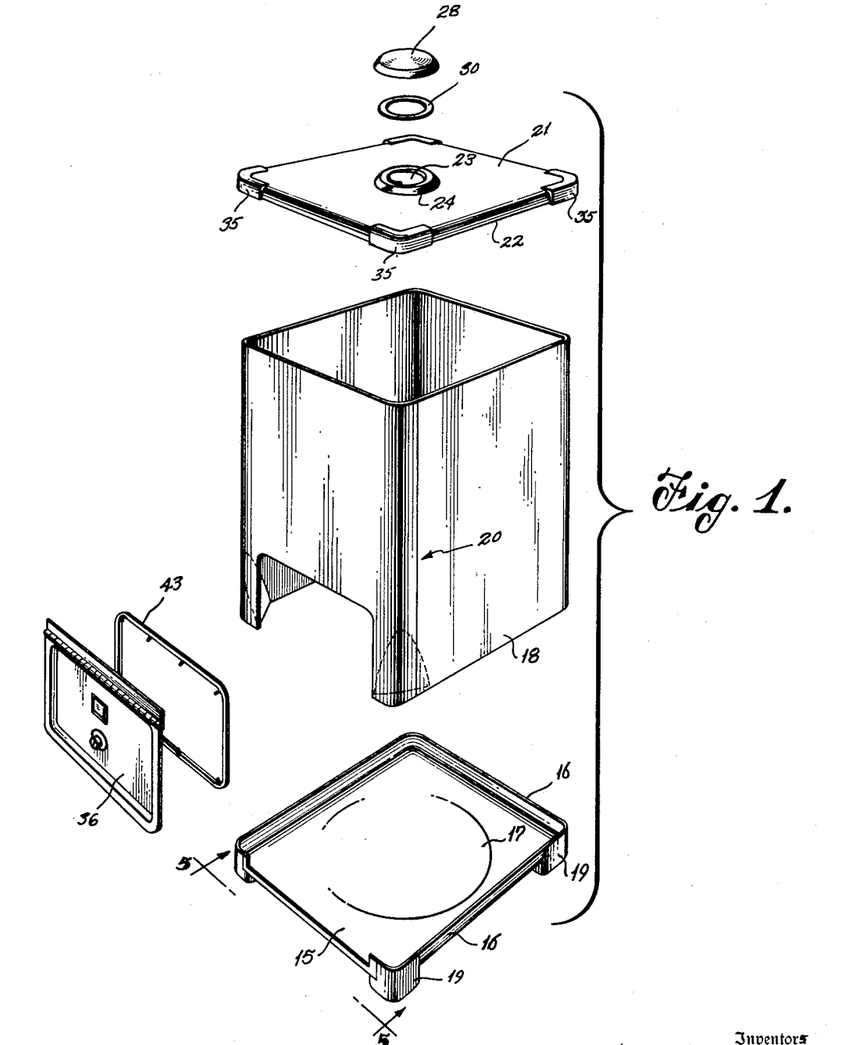
Figure 1 is an exploded perspective view showing a device embodying our invention.

Referring to Fig. 1 of the drawings, the bottom wall of the bin comprises a horizontal portion 15, vertical portions 16 and a central convex portion 17. The bottom 15—16—17 is preferably of substantially heavier construction than the side walls 18. This provides for a bottom surface against which the tines of commercial fork lift trucks can frequently engage and provide substantial wear resistance. Also by having the side walls 18 substantially flexible and the bottom wall 15—16—17 substantially rigid, horizontal thrust against the bins of our invention can be transferred to the material being transported and with minimum shock against the bins.

The convex portion 17 permits the bottom 15—16—17 to expand or move downwardly by reason of the weight of the load and to maintain a minimum distance between said bottom 15—16—17 and the supporting platform on which rest the legs 19. Thus there will be sufficient space for the insertion of the tines of an industrial fork lift truck.

The legs 19 are secured to the bottom 15—16—17 as by welding and are disposed on the four corners of the bin. The bin is preferably a rectangular type of bin to economize shipping or storage space. As the bins will probably be used in connection with rail transportation, their dimensions should have a definite correlation to the size of standard box cars which approximately are: 40 feet long, 9 feet 6 inches wide, 9 feet high or, 50 feet long, with substantially the same width and height dimensions. For accommodation of the bins in freight cars, truck carriers, storage about flour mills, bakeries and the like in warehouses and docks, we have found that the most suitable dimensions of the bins of our invention are those having an outside dimension of 42 inches wide, 48 inches long, and 68 inches high.

The side walls 18 may be formed of a continuous piece of material and the lower edge portions thereof are preferably welded to the vertical portion 16 of the bottom member. The end portions of said continuous strip can be butted and welded to form seam 20. The bottom 15—16—17 may be stamped from one piece of material and similarly the top portions 21 and vertical portions 22 may be stamped from a single piece of material. Preferably the top 21—22 is formed of material of substantially the same gauge as the bottom 15—16—17 and both said top and bottom are relatively rigid members as distinguished from the side walls 18 which are substantially flexible members.

The horizontal portion 21 of the top is provided with an aperture 23 therein. It is desired that the aperture or opening 23 be sufficient so that rapid filling and proper distribution of material in the bin may be accomplished. The apparatus for filling the bins rapidly, efficiently and uniformly is the subject matter of a separate application by C. W. Scott, Serial No. 66,159, filed December 20, 1948, and now Patent No. 2,596,824. In view thereof the details of such filling mechanism will not be set forth and only the general nature of the problem will be discussed. In the event that granular material, such as flour, is being shipped in bins of our invention, the flour may be moved downwardly by a spout through opening 23 but the flour will tend to form a conical surface as flour is without substantial head. Thus in order to fully utilize the space in the bin it is necessary to provide means to distribute the flour uniformly and provide a horizontal surface on the top of the pile rather than a conical surface. In said co-pending application we have indicated rotary impeller means for discharging the flour in a horizontal plane and thus the opening 23 must have sufficient diameter to permit the impeller to enter into the bin.

As a means of closing and sealing the opening 23 (see also Figs. 1 and 14 to 17) a collar 24 is stamped out of the horizontal portion 21 of the top. The collar 24 is provided with two cam portions which start from a lower portion 25 and terminate with a higher portion 26.

Figure 2:
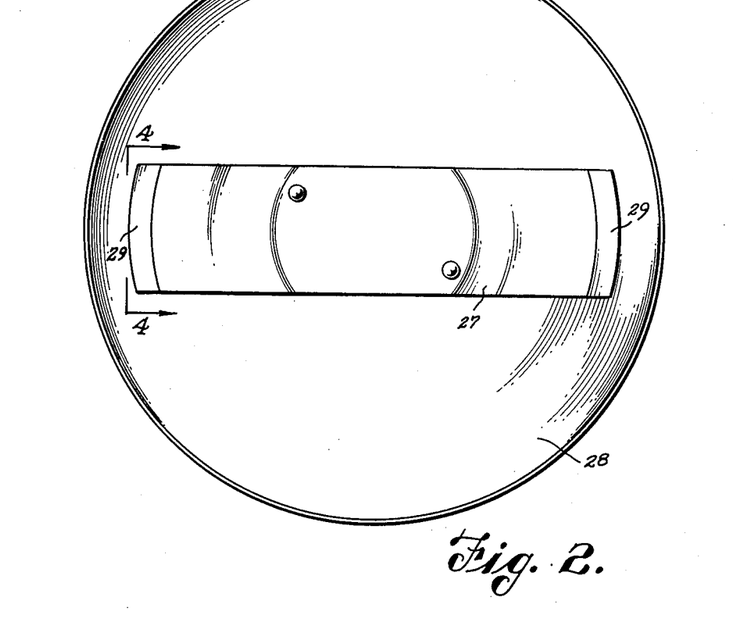
Fig. 2 is a bottom plan view of the top member and on a larger scale than Fig. 1.
Figure 3:
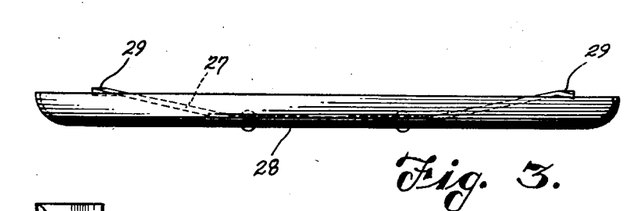
Fig. 3 is a view in elevation of the structure shown in Fig. 2.
Figure 4:
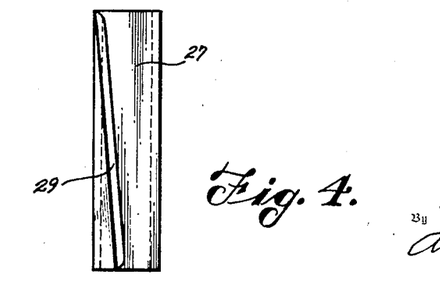
Fig. 4 is a view in elevation and taken substantially on broken line 4—4 of Fig. 2 and showing the cross bar or cover securing lever.
Figure 5:
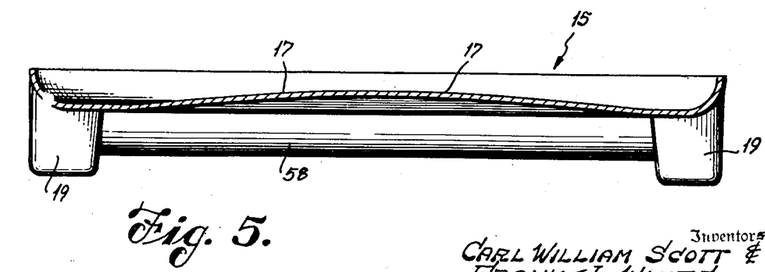
Fig. 5 is a detached view in elevation and on a larger scale than Fig. 1 of the bottom member and taken substantially on broken line 5—5 of Fig. 6.
Figure 6:
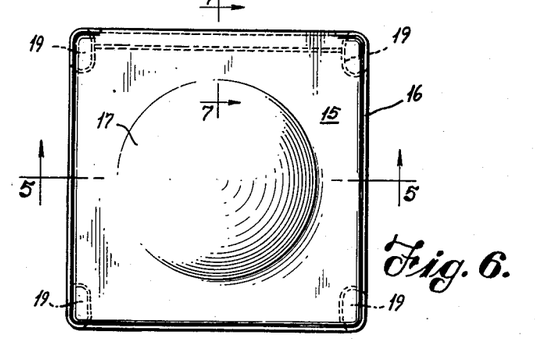
Fig. 6 is a view in plan of the bottom member.
Figure 7:
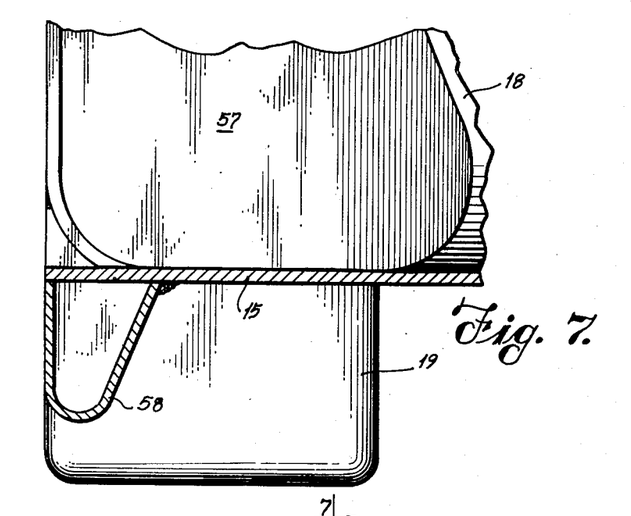
Fig. 7 is a detached fragmentary view on a larger scale than Fig. 6 and taken substantially on broken line 7—7 of Fig. 6.

These two cam portions 25—26 provide a screw thread for the reception of a cross bar or lever 27 carried by a cap 28. The end portions of the cross bar 27 (see Figs. 2 to 4) have inclined mating portions 29 which mate with the under side of the cam portions 25—26 so that the cross bar 27 and cap 28 carried thereby can be angularly moved and cause the cap 28 to be sealed in place. Preferably a packing member, such as a rubber ring 30 (see Figs. 1 and 15), is provided between cap 28 and collar 24 to cause an air tight seal between the cap 28 and the collar 24.

In order to evidence unauthorized opening of the cap 28, a lug 31 is provided and carried by the collar 24. Also an external portion of the cap 28, as the rim 32 thereof, is provided with an opening 33. The opening 33 is on the outside of the rubber ring 30 and thus is not in communication with the interior of the bin. When the cap 28 is screwed tight, the opening 33 registers with an opening 34 in lug 31 and the usual lead and wire seal 64 may have the wire portion threaded through said openings and through the lead portion of the seal and then have the lead portion of the seal compressed to hold the parts in this position and indicate the tool sealing the same. A lead and wire seal or other tamper proof seal should be employed as the product carried by the bin may be a food product and thus every effort should be made to insure that the sanitary conditions obtained at the time of filling of the bin are not changed during shipment and before opening of the bin by the consumer or repackager.

As it is desired to provide a bin which is subject to high piling or having the bins superposed, reinforced corners 35 (Fig. 1) are provided on which the legs thereabove of an upper bin may rest. These corners 35 may be welded to the top 21—22.

An opening is provided adjacent the horizontal portion 15 of the bottom and which opening is closed and sealed by a door 36 (Figs. 1, 8, 9, 10, 11, 12, and 13). The door 36 may be stamped from one piece and preferably comprises a recessed portion 37, shoulders 38, flanges 39 and a portion 40 of a hinge. The balance of the hinge comprises hinge portion 41 carried by a plate 42 which plate 42 is suitably secured to the front side wall 18 which surrounds the opening closed by door 36.

The door 36 is provided with an air tight seal between it and the front wall 18 so as to insure against contamination after the bin has been filled. The seal may comprise a continuous rectangular rubber backing or sealing member 43 (Fig. 1) carried by the door 36. The rubber seal 43 may be formed as a continuous and substantially rectangular member having projecting tabs 44 (Fig. 9) formed integrally with the rubber seal 43. These projecting tabs 44 are tapered to provide a pointed end portion 45 which can be urged through openings 46 in the door 36 and thereafter elongated by pulling on said pointed portions 45 and reduce the diameter of the tabs 44 so they will pass through openings 46. If tab 44 is urged into an opening 46 until the rubber seal 43 rests against the door 36, the tabs 44 may be released and they will expand sufficiently in diameter to cause the rubber seal 43 to be held in place and carried by the door 36. This construction is important where food products are involved as the rubber seal is removable for cleaning purposes and adhesives, which may collect dirt, are eliminated.

Internally positioned locking rods 47, externally operable by a key operated boss 48 are preferably employed. Also, all internal surfaces of the bin are so arranged as to eliminate corners or recesses into which a granular product may lodge. In order to insure against unsanitary conditions, the internal surfaces of the bin should be of metal, as aluminum, Monel, durel, or metals having substantially similar properties; non-absorbent plastics; Fiberglas or the like. Metal parts are highly desirable as they provide for suitable sanitary conditions and at the same time permit substantially flexible side walls 18 and relatively substantially rigid top and bottom walls.

The locking rods 47 have their inner ends pivotally connected to laterally spaced pins 49 which are carried by a U-shape bracket 50 which in turn is secured to the boss 48. Thus upon angular movement of the boss 48, the pins 49 angularly move and the locking rods 47 are extended or contracted depending upon the nature and extent of the angular movement of the boss 48. The boss 48 is preferably operable by a key way 51 so as to require a special tool to angularly move boss 48 and open the door 36. In order to provide an air tight sealing means and at the same time permit the boss 48 to angularly move, an internally threaded boss 52 is carried by the door 36 as by rivets 53. The boss 48 is externally threaded and the threads thereof are mated with the internal threads in the boss 52. Keepers 54 are carried by the inside of door 36 and slidingly mount the outer end portions of the locking rods 47. The keepers 54 are of a size to permit some angular movement of the locking rods 47 as well as longitudinal movement thereof. At the outer end portions the locking rods 47 are provided with portions 55 which engage against inclined portions 56 of fillets 57 carried by the front wall 18. Longitudinal movement of the portions 55 outwardly and against inclined portions 56 cause the door 36 to be locked and at the same time to move sufficiently inwardly so as to compress the rubber 43 and provide an air tight seal between the door 36 and the front wall 18 surrounding the opening closed by the door 36.

Fillets 57 are concave and remove any corners so that the contents of the bin may be unloaded by tipping the bin about an axis aligned with the bottom of door 36. Fillets 57 are disposed in each of the two front corners adjacent to the door 36. The front edge of the bottom floor 15 is aligned with and provides the bottom edge of the door opening.

Preferably the skid formed on the bottom of the bin is such to permit the tines of a lift truck to be moved in from each side between legs 19 or from the back and between legs 19. This will prevent strain about the door opening which might tend to jam the door so it cannot be opened. Thus a cross member 58 (Figs. 10 and 11) provides for restricted clearance between the two front legs 19. However, the cross member 58 does not reach the lower level of legs 19 so that the tip portions of the tines of a lift truck can be moved under the cross member 58 and the bin may have its front lower edge picked up and the box turned to a desired position so that it can be picked up and moved by the tines of a lift truck from the side or the back as desired. In other words, the bin will provide a three-way opening for the tines of a lift truck and a fourth opening will be restricted so that the bin can be turned from the front opening but not picked up thereby.

A longitudinally extending rod 59 connects between the front wall and the rear wall and at the location of the top of door 36. This tends to maintain the door in alignment.

Figures 8, 9, 10:
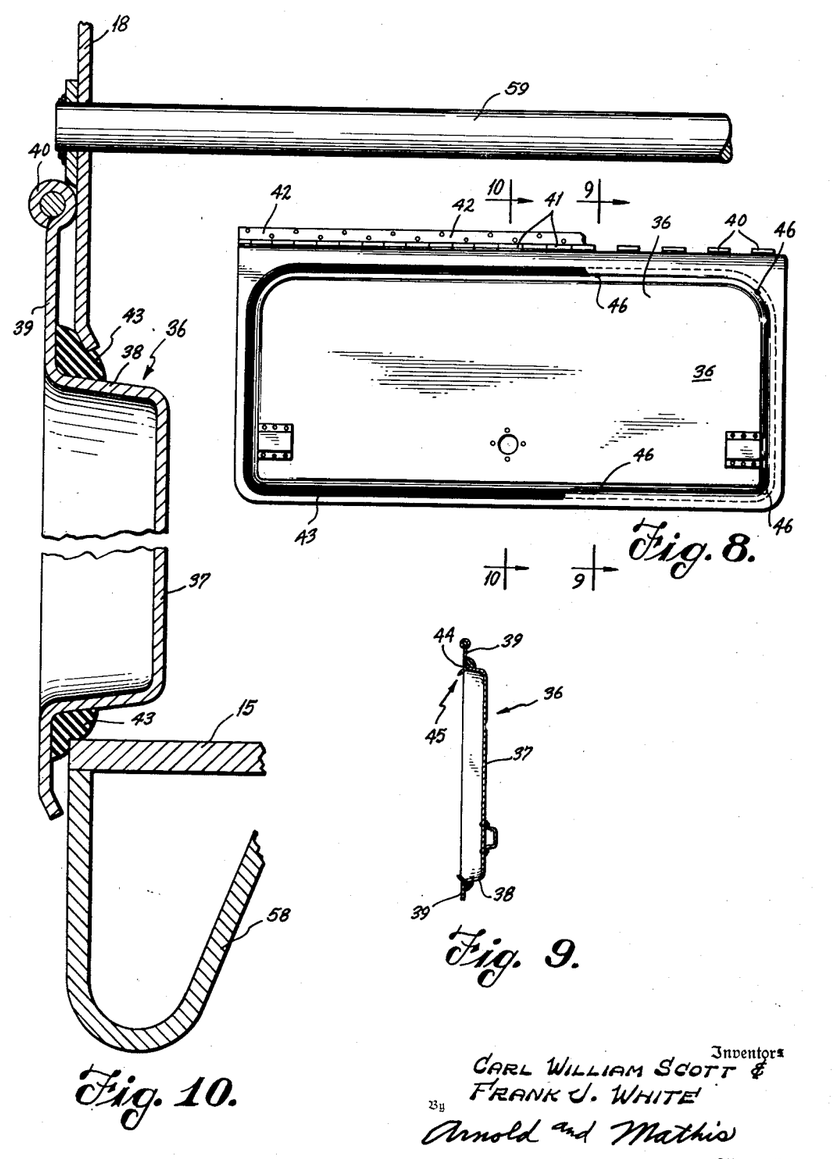
Fig. 8 is a fragmentary elevational detached view showing the unloading door.
Fig. 9 is a sectional view, on a smaller scale than Fig. 8 and taken substantially on broken line 9—9 of Fig. 8.
Fig. 10 is a fragmentary sectional view, on a larger scale than Fig. 8, and taken substantially on broken line 10—10 of Fig. 8.
Figure 11:
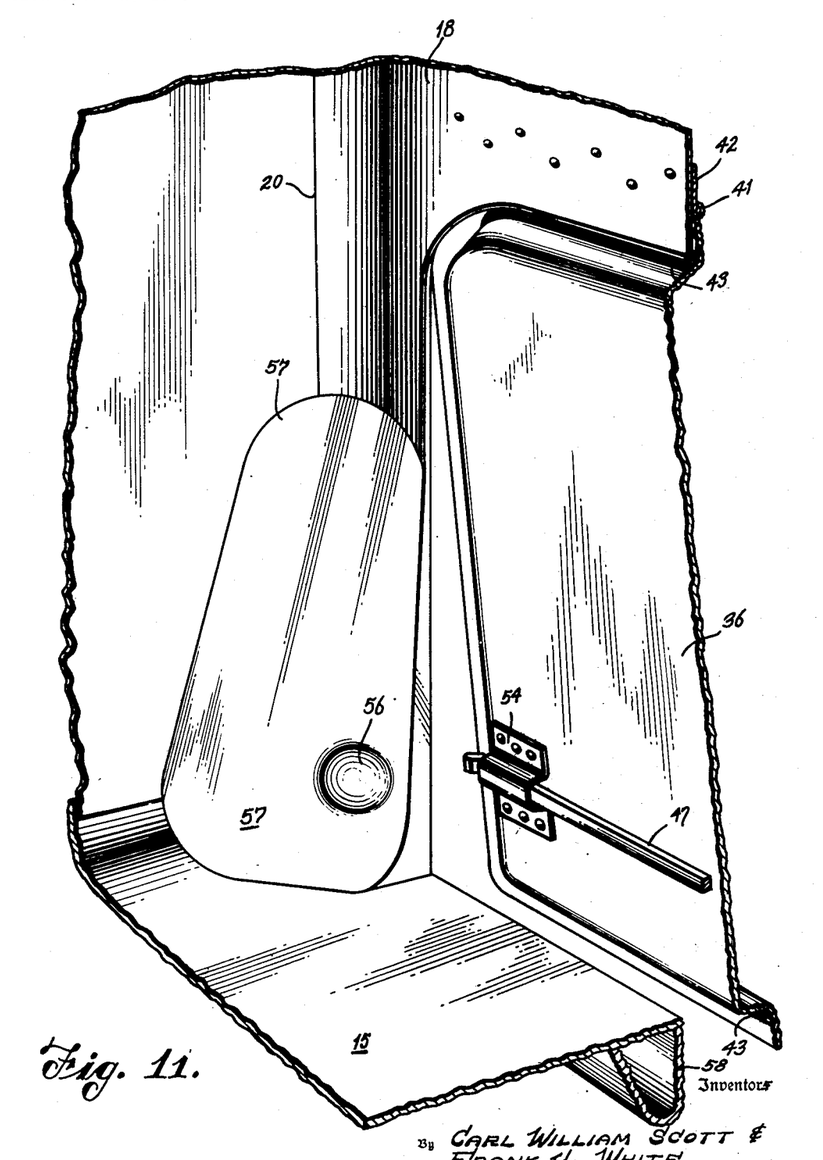
Fig. 11 is a fragmentary perspective view taken from the inside of a bin of this invention and looking outwardly past a fragment of the unloading door.
Figures 12, 13:
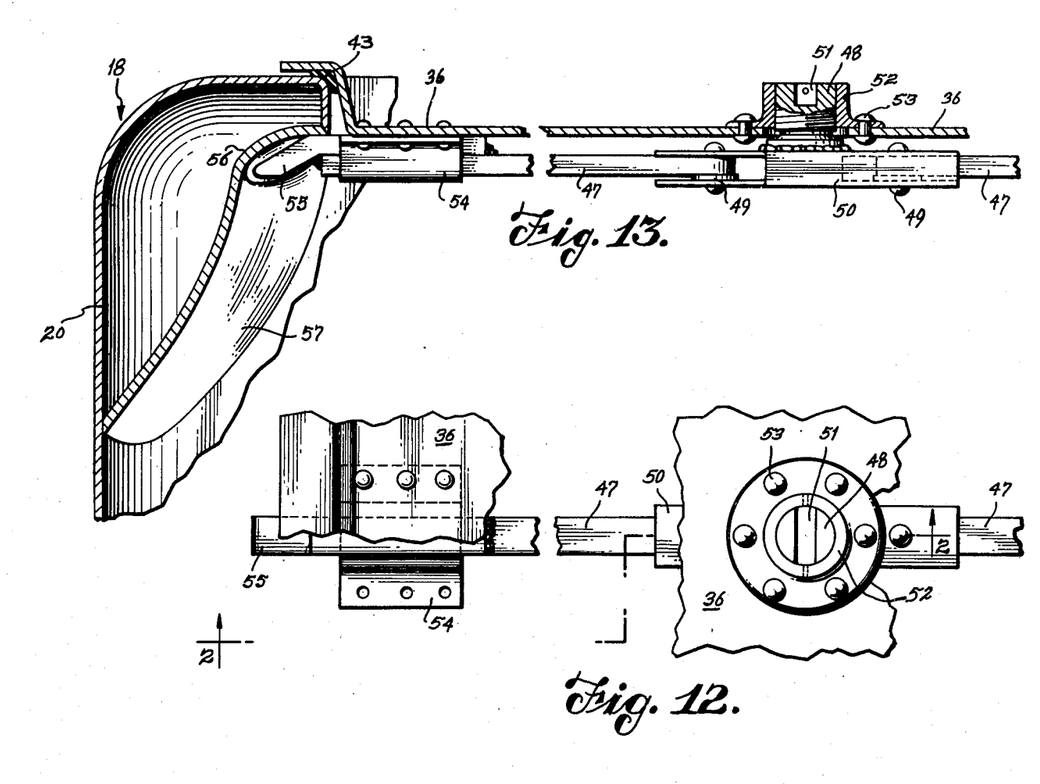
Fig. 12 is a fragmentary view and elevation looking directly at the locking mechanism for the unloading door.
Fig. 13 is a sectional view taken substantially on broken line 2—2 of Fig. 12.
Figure 14:
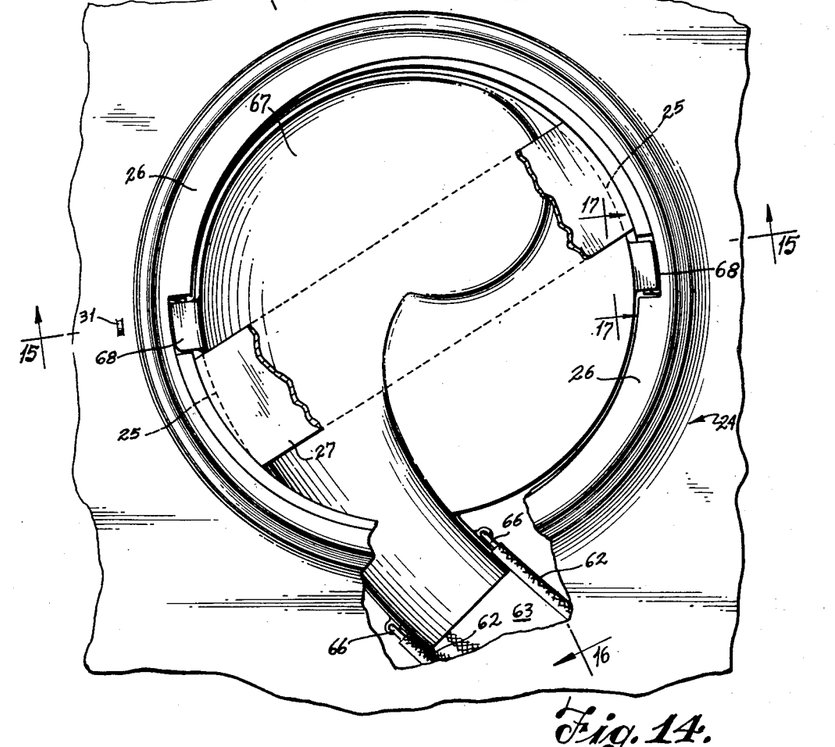
Fig. 14 is a fragmentary top plan view, with parts broken away, of the loading opening, top cap, and associated parts of a device embodying our invention and indicating an accessory loading device.
Figure 15:
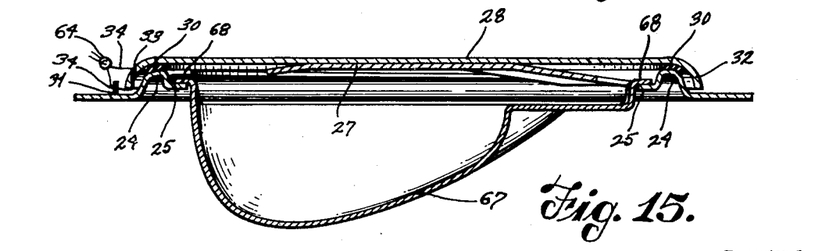
Fig. 15 is a sectional view taken substantially on broken line 15—15 of Fig. 14.
Figure 16:
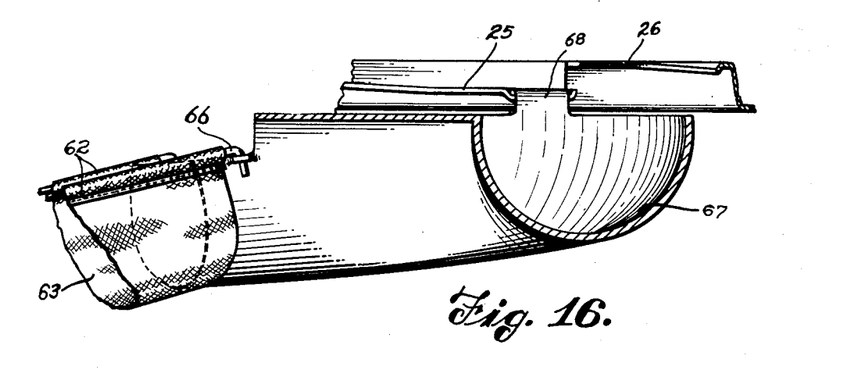
Fig. 16 is a sectional view with parts shown in elevation taken substantially on broken line 16—16 of Fig. 14.
Figure 17:
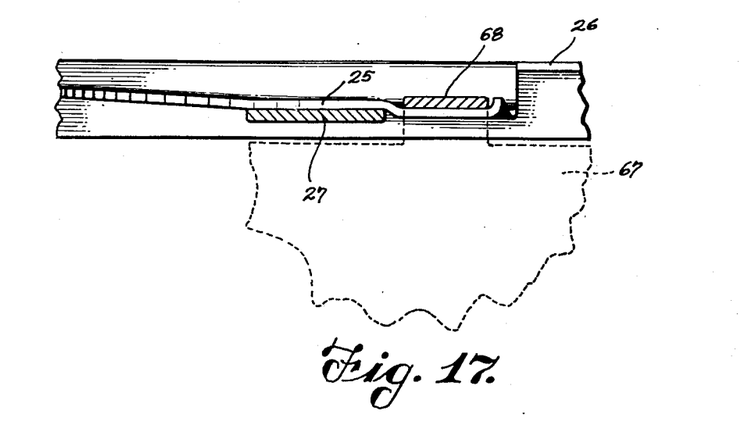
Fig. 17 is a sectional view taken substantially on broken line 17—17 of Fig. 14.
Figure 18:
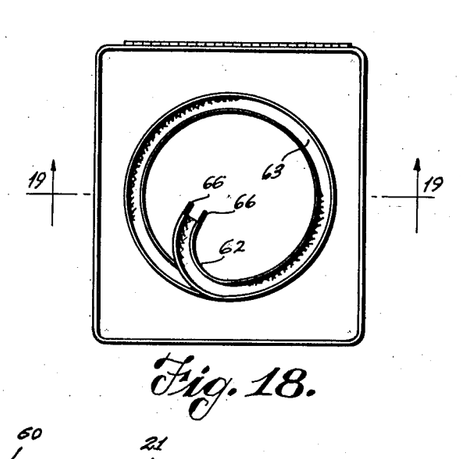
Fig. 18 is a top plan view, with the top removed, on a smaller scale than Figs. 14-17, and showing a bin in combination with the loading accessory indicated in said Figs. 14-17 inclusive.
Figure 19:
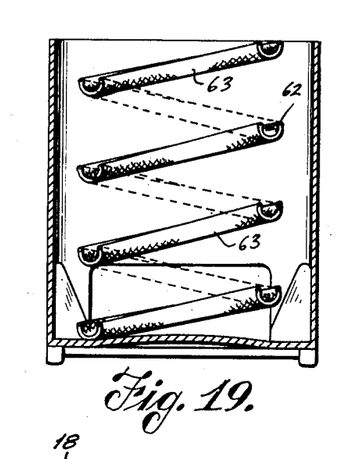
Fig. 19 is a sectional view, with parts in elevation, of the construction shown in Fig. 18 and taken substantially on broken line 19—19 of Fig. 18.
Figure 20:
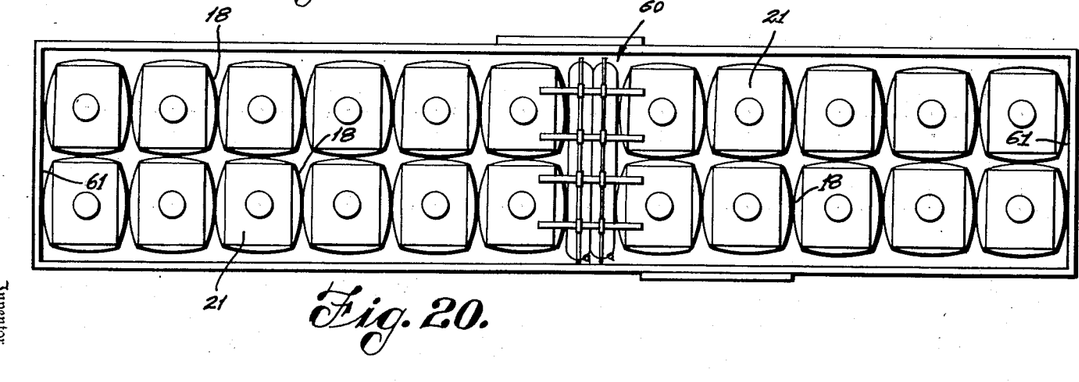
Fig. 20 is a fragmentary view in plan illustrating loaded bins of this invention which have been positioned and shored in a freight car.

Referring now to Fig. 20 of the drawings, a plurality of bins of our invention are indicated in plan. It will be noted that the tops 21 maintain their rectangular form but that the side and end walls 18 have bulged or have assumed a convex shape in a horizontal section taken therethrough. The rod 59 of Fig. 10 is long enough to permit such bulging. Also, the rod 59 is sufficiently flexible so that its mid-portion may rise and fall to allow the bulged portions to move inwardly and outwardly—outwardly within the limitation provided by the length of the rod 59. When the pneumatic shoring device 60 is inflated the bins will be urged toward the ends of a shipping space, such as the bulk head 61 of a freight car. Thus the bulging positions of the walls 18 of adjacent bins will be urged firmly into contact. When a freight car is being jolted, such as during yarding or making up or breaking up of a train, granular material within the bins will take the load and strain and the bins will be protected thereby. Due to the flexible nature of the side walls 18 we are able to make the bins of a minimum and predetermined weight and mass and with sufficient strength to carry substantial loads under conditions as described. If the walls 18 were rigid, the devices would have to be of a plurality times greater mass and strength to carry the same weight and quantity of materials.

Referring now to Figs. 14 to 20 of the drawings, an accessory means for loading products, as apples, citrus fruits, and the like into bins of our invention is indicated. This loading member comprises a spiral loader formed by spaced apart metal spirals 62 and fabric belt 63 therebetween providing for a spiral trough. With this construction apples or oranges or the like can be rolled down the spiral trough 62—63 and the said fruit will not be damaged by impact with the bottom of the bin.

The spiral trough 62—63 may be substantially larger than the top opening 23 of the bin as the said trough may be angularly moved while it is being lowered into position. The spiral trough 62—63 terminates in the hook-like portions 66 (see particularly Figs. 14, 16, and 18). A feeder mechanism for the trough 62—63 comprises an inclined and concave trough-like member 67 which may be formed of metal, plastics or the like. The trough-like portion 67 is held in place and in turn supports the spiral trough 62—63 by means of clips or tabs 68 which are supported by the collar 24 and more particularly the end portion 25 of the same. Any other suitable means may be provided to support the feeder trough 67 and the spiral trough 62—63. The construction indicated is ample and can readily be removed when the bin is being used to stow types of articles not involving the need of said accessory troughs. After the bin is loaded, the spiral trough 62—63 and the feeder trough 67 need not be removed and can be shipped with the load. If the material fills up the bin, the articles will fall off the trough and a compact load obtains even though the spiral trough 62—63 in the trough 67 is left and imbedded in the load.

To unload material from the bin the bin 15 is angularly moved, such as to about forty-five degrees, and the door 36 is opened. Material will then pass out through the open door and may be disposed in any suitable receptacle. Means for unloading the bin are the subject matter of a separate invention by us and will be shortly copending with this application, Serial No. 143,094, filed February 8, 1950, and now Patent No. 2,578,116. In view thereof the details of such unloading mechanism are not set forth here in detail and only the general nature of the problem has been discussed.

Obviously, changes may be made in the forms, dimensions and arrangement of the parts of the invention without departing from the principle thereof, the above setting forth only preferred forms of embodiment of our invention.

We claim:

A package of granular material and a container therefor, said container comprising a relatively rigid and substantially rectangular bottom member, leg members extending from each corner of the said bottom member and supporting said bottom member and at an elevation to accommodate the tine of a lift truck below said bottom member and between said leg members; a substantially rectangular rigid top member corresponding in shape to the bottom member and having a loading opening therein; a body member substantially rectangular in horizontal cross section and rigidly joined to said bottom and top members, said body member being formed from a relatively thin, flexible, and continuous metallic sheet with the side walls of said body member being smooth and planar when the container is empty and being the sole connection between said top and bottom members, and permitting outward deflection of said side members intermediate the height thereof by the weight and movement of a granular bulk load in the bin, the said granular material being disposed in said container and bulging the said side members both vertically and horizontally; whereby a plurality of said loaded bins can be aligned with deflected side portions abutting and shock or jar on an outer bin thereof will be dissipated by inward movement of said deflected side members and thus said shock or jar is substantially completely resisted by the granular bulk load; and an unloading opening provided in a side wall of the bin and adjacent the bottom wall thereof, whereby the bin may be loaded with granular material when the same is supported by its leg members on a substantially even support and the bin may be unloaded by tilting the same so that the lower portion of the unloading opening is relatively lower than the bottom of the bin.

FRANK J. WHITE.
CARL WILLIAM SCOTT.

References Cited in the file of this patent

UNITED STATES PATENTS

| Number | Name | Date |
|---|---|---|
| Re. 17,204 | Johnson | Feb. 5, 1929 |
| 1,015,907 | Ryder | Jan. 30, 1912 |
| 1,317,771 | Adams | Oct. 7, 1919 |
| 1,795,989 | Adams | Mar. 10, 1931 |
| 1,831,687 | Ross | Nov. 10, 1931 |
| 1,864,684 | Woodruff | June 28, 1932 |
| 1,927,657 | Evans | Sept. 19, 1933 |
| 1,937,487 | Eilers | Nov. 28, 1933 |
| 1,988,514 | Ricketts | Jan. 22, 1935 |
| 2,028,366 | Warren | Jan. 21, 1936 |
| 2,073,990 | Koch | Mar. 16, 1937 |
| 2,260,424 | Waters | Oct. 28, 1941 |
| 2,457,842 | Smith et al. | Jan. 4, 1949 |
| 2,462,693 | Wabshaw | Feb. 22, 1949 |

FOREIGN PATENTS

| Number | Country | Date |
|---|---|---|
| 66,909 | Norway | Oct. 18, 1943 |
| 402,604 | Great Britain | Dec. 7, 1933 |